United States Patent
Jethva (10) Patent No.: US 11,468,898 B2
(45) Date of Patent: Oct. 11, 2022

(54) COMMON SKILL STORE FOR DIFFERENT VIRTUAL ASSISTANTS

(71) Applicant: Capital One Services, LLC, McLean, VA (US)

(72) Inventor: Rajan Jethva, Milpitas, CA (US)

(73) Assignee: Capital One Services, LLC, McLean, VA (US)

(*) Notice: Subject to any disclaimer, the term of this patent is extended or adjusted under 35 U.S.C. 154(b) by 42 days.

(21) Appl. No.: 17/036,552

(22) Filed: Sep. 29, 2020

(65) Prior Publication Data
US 2021/0264920 A1  Aug. 26, 2021

Related U.S. Application Data (63) Continuation of application No. 16/795,812, filed on Feb. 20, 2020, now Pat. No. 10,832,681.

(51) Int. Cl.
| | |
|---|---|
| *G06F 8/65* | (2018.01) |
| *G10L 15/30* | (2013.01) |
| *G06F 11/14* | (2006.01) |
| *G06F 3/16* | (2006.01) |
| *H04L 67/55* | (2022.01) |

(52) U.S. Cl.
CPC .............. *G10L 15/30* (2013.01); *G06F 3/167* (2013.01); *G06F 8/65* (2013.01); *G06F 11/1464* (2013.01); *H04L 67/55* (2022.05)

(58) Field of Classification Search
CPC ... G06F 8/61; G06F 8/65; G06F 11/00; G10L 15/22
See application file for complete search history.

(56) References Cited

U.S. PATENT DOCUMENTS

| | | | | |
|---|---|---|---|---|
| 9,032,383 | B2* | 5/2015 | D'Aurelio | G06F 40/143 717/169 |
| 9,577,946 | B1* | 2/2017 | Eilam | H04W 4/50 |
| 10,311,347 | B2* | 6/2019 | Ramadan | G06Q 99/00 |
| 10,417,116 | B2* | 9/2019 | Horesh | G06F 11/3692 |
| 10,832,681 | B1* | 11/2020 | Jethva | G06F 11/1464 |
| 2011/0219019 | A1* | 9/2011 | Peng | G06F 15/16 707/769 |
| 2013/0325460 | A1* | 12/2013 | Kim | G10L 15/22 704/231 |
| 2016/0034273 | A1* | 2/2016 | Leopold | G06F 8/71 717/122 |

(Continued)

*Primary Examiner* — Shreyans A Patel
(74) *Attorney, Agent, or Firm* — Banner & Witcoff, Ltd.

(57) ABSTRACT

Methods, apparatuses, and systems of a common skill store are described herein to provide common skill storage and distribution for different virtual assistants on different provider platforms. A developer may not be bound by any virtual assistant or provider platform to develop skills in a required computer programming language, format, or style. They also need not to develop the same skill multiple times for different virtual assistants. After receiving a request to download a skill for use on any virtual assistant and provider platform, the common skill store may modify the requested program code to adapt it for the requesting virtual assistant. If a user has multiple user devices with different virtual assistants, they may only need to request the same skill one time, and the common skill store may send different sets of adapted program code to the multiple user devices with the different virtual assistants.

20 Claims, 9 Drawing Sheets

(56) References Cited

U.S. PATENT DOCUMENTS

| | | | |
|---|---|---|---|
| 2016/0378453 A1* | 12/2016 | Kalidindi | G06F 8/65 |
| | | | 717/173 |
| 2017/0075673 A1* | 3/2017 | Machalani | G06F 8/61 |
| 2017/0126510 A1* | 5/2017 | Jones-Mcfadden | ......... |
| | | | H04L 41/0823 |
| 2018/0032314 A1* | 2/2018 | Gorbaty | G06F 11/36 |
| 2019/0354821 A1* | 11/2019 | Ramadan | H04W 4/50 |

* cited by examiner

COMMON SKILL STORE FOR DIFFERENT VIRTUAL ASSISTANTS

CROSS REFERENCE TO RELATED APPLICATIONS

This application is a continuation of U.S. patent application Ser. No. 16/795,812 entitled "A COMMOM SKILL STORE FOR DIFFERENT VIRTUAL ASSISTANTS" and filed on Feb. 20, 2020. The aforementioned application is incorporated by reference in its entirety.

FIELD OF USE

Aspects of the disclosure relate generally to computer hardware and software that can be used to store and distribute skills for virtual assistants. More specifically, aspects of the disclosure may provide a common skill store for storing and distributing common skills for different virtual assistants on different provider platforms.

BACKGROUND

Modern life has become more and more convenient with help from virtual assistants. Virtual assistants are, for example, software code or applications running on a computing device. Virtual assistants may receive voice command activation and provide voice and information interaction (e.g., the Alexa virtual assistant by Amazon, the Google Home virtual assistant by Google, etc.). Virtual assistants may need skills to improve their capabilities to interact with users. A skill is program code such as, for example, a set of program code that can be executed by a virtual assistant to implement a function. Different virtual assistants on different provider platforms may need a same skill to implement the same function. However, different provider platforms may require a developer to develop the same skill in different computer programming languages, formats, and styles. A user may have multiple user devices with different virtual assistants. For the same skill for the different virtual assistants, the user may need to request multiple times from different stores. There is a need for novel methods, apparatuses, and systems for providing a common skill store for storing and distributing common skills for different virtual assistants on different provider platforms.

Aspects described herein may address these and other problems, and generally improve the efficiency of developing, storing, and distributing skills across provider platforms.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for a common skill store for different virtual assistants. This may have the effect of generally improving the efficiency of skill development, storage, and distribution systems. According to some aspects, these and other benefits may be achieved by the common skill store modifying a set of common skill program code to generate sets of adapted program code configurable by different virtual assistants. In implementation, this may be effected by converting statements of the common skill program code in one computer programming language to another computer programming language, or modifying a configuration portion of the common skill program code.

More particularly, some aspects described herein may provide a computer-implemented method for storing and distributing common skills for different virtual assistants. A common skill store may receive computer-readable program code from a developer device. The program code may be executable to implement a function for a number of virtual assistants. Among the number of the virtual assistants, each of them may be configured to run on one of a number of provider platforms. The common skill store may store the program code in storage media. The program code may be requested by a user to be downloaded from the common skill store. After the common skill store receives a request to download the program code, the common skill store may perform an authorization of a user account associated with the request. The user account may be associated with only one device with one virtual assistant, or a few devices with a same virtual assistant, or a few devices with different virtual assistants. In the case where there is only one virtual assistant, the common skill store may modify some portions of the requested program code to generate adapted program code. The adapted program code may be configured to run in a runtime environment associated with the one virtual assistant. The common skill store may then send the adapted program code to the one or more user devices and cause the user device(s) to install the adapted program code to be accessed by the one virtual assistant running on the user device(s). In the case where there are different virtual assistants, the common skill store may modify the requested program code to generate multiple sets of adapted program code for the different virtual assistants. Furthermore, the common skill store may back up the adapted program code in a cloud storage associated with the user account.

Corresponding apparatuses, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for storing and distributing common skills for different virtual assistants. As discussed further herein, this combination of features may allow for a common skill store.

Before discussing these concepts in greater detail, however, several examples of a computing device that may be used in implementing and/or otherwise providing various aspects of the disclosure will first be discussed with respect to FIG. 1.

Figure 1:
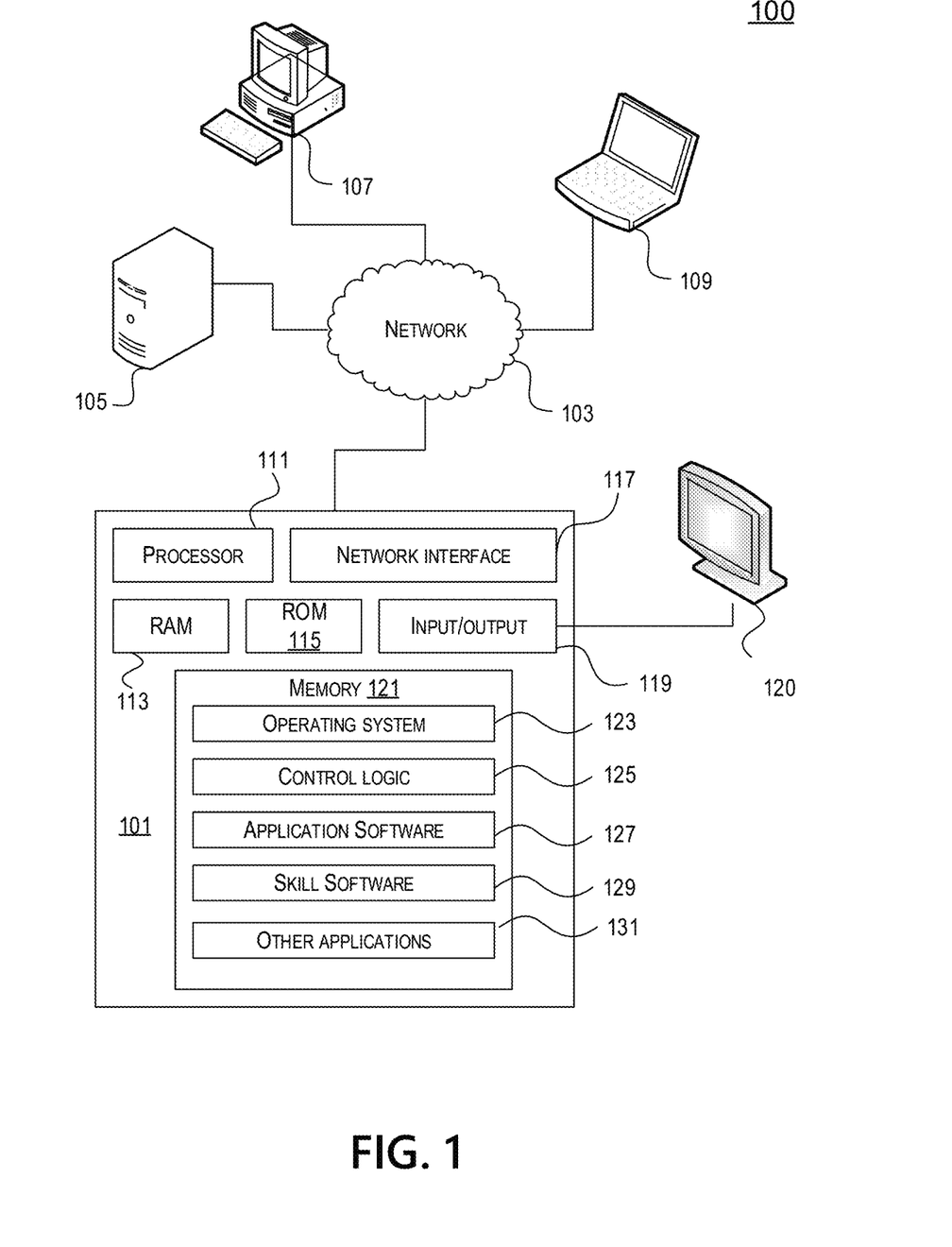
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, application software 127, skill software 129, and other applications 129. Control logic 125 may be incorporated in and may be a part of application software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer-executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer-executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a system and method for providing a common skill store for different virtual assistants.

Figure 2:
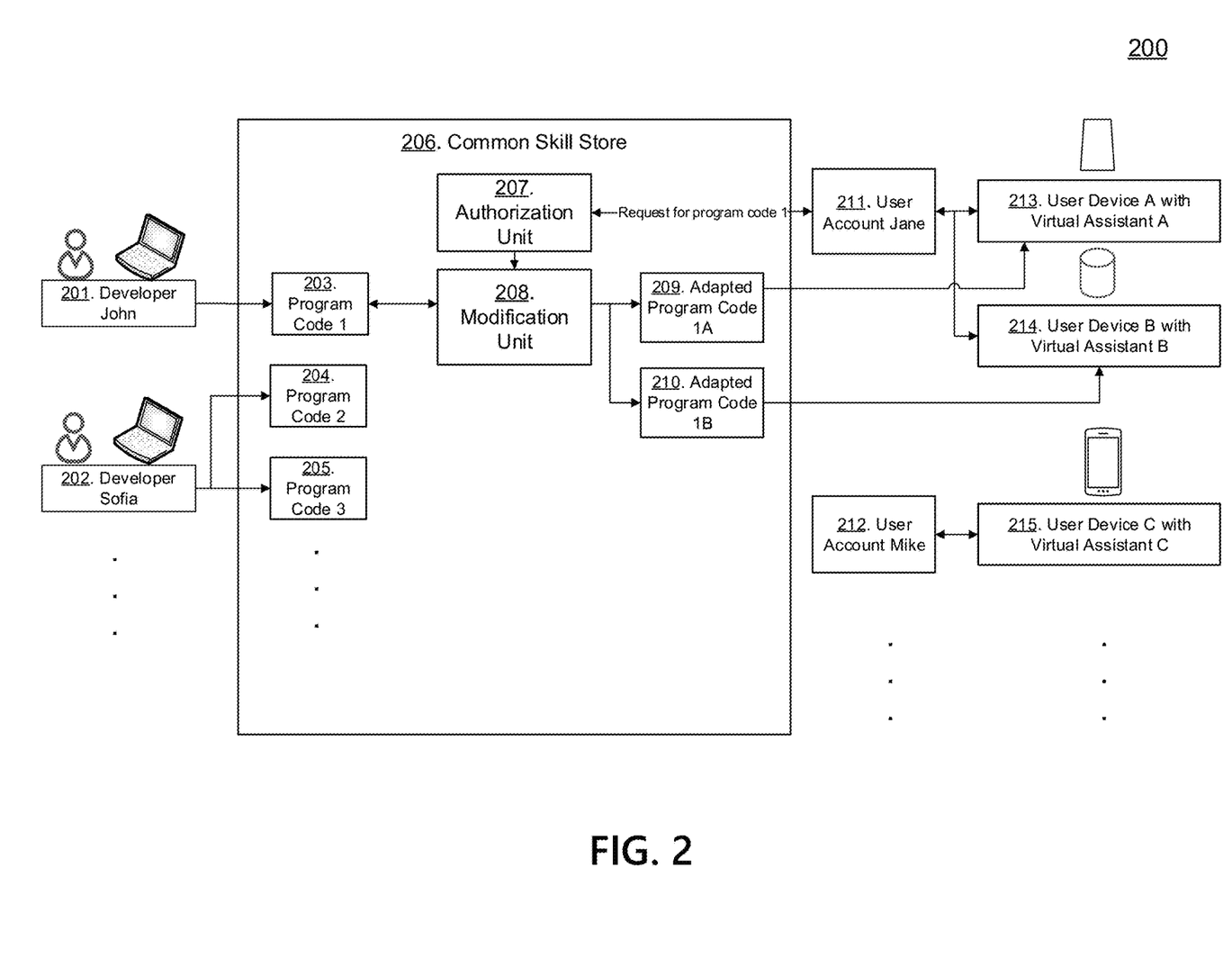
FIG. 2 depicts an example of a system architecture that may be used in implementing common skill storage and distribution in accordance with one or more illustrative aspects discussed herein.

FIG. 2 depicts an example of a system architecture 200 that may be used in implementing common skill storage and distribution in accordance with one or more illustrative aspects discussed herein. System 200 may generally comprise a common skill store 206 that functions as a storage and distribution center between developers (e.g., 201, 202, . . . ) and users (e.g., 211, 212, . . . ). The common skill store 206 may also comprise storage media, an authorization unit 207, and a modification unit 208. The storage media of the common skill store 206 may be a physical or virtualized data storage, or a public or private cloud data storage.

When developing skills for the common skill store 206, developers (e.g., 201, 202, . . . ) may not be bound by any virtual assistant or provider platform in regard to computer programming languages, formats, and/or styles. Developers (e.g., 201, 202, . . . ) may develop skills in any computer programming language of their choosing (e.g., Java, C, C #, C++, Python, JavaScript, Ruby, PHP, TypeScript, LinuxShell, etc.). Developers (e.g., 201, 202, . . . ) may also develop skills in any formats and/or styles of their choosing. The common skill store 206 may accept skills in any computer programming languages, formats, and/or styles, and the modification unit 208 may modify the skills to adapt to different virtual assistants on different provider platforms. A developer (e.g., 201) may submit one set of program code (e.g., 203), or a developer (e.g., 202) may submit more than one set of program code (e.g., 204 and 205). When submitting skill program code, developers (e.g., 201, 202, . . . ) may need to sign into their developer accounts. The submitted program code may be tagged with corresponding developer accounts. A user (e.g., 211, 212, . . . ) may search for program code in the common skill store 206 based on developer accounts.

Users (e.g., 211, 212, . . . ) may request to download a set of skill program code from the common skill store 206. A user (e.g., 212) may have only one user device (e.g., 215) with one virtual assistant running on one provider platform. A user (e.g., 211) may have more than one user device (e.g., 213 and 214) with more than one virtual assistant running on more than one provider platform. The one or more user devices (e.g., 213 and 214) may also have the same virtual assistant running on the same provider platform. The user devices (e.g., 213, 214, 215, . . . ) may each include a headless speaker with a built-in virtual assistant, or a smart display with a built-in virtual assistant, or a mobile device with a virtual assistant application installed. A user (e.g., 211, 212, . . . ) may need to sign into their user account before requesting to download a set of skill program code.

After a user (e.g., 211) submits a request for a set of skill program code (e.g., 203), the authorization unit 207 may check a user account associated with the user. The authorization unit 207 may check if the user (e.g., 211) is authorized to access the program code (e.g., 203). The program code (e.g., 203) may be free to all users. The program code (e.g., 203) may be free to all users, but may have restrictions such as age. The program code (e.g., 203) may be required to be purchased. If the program code (e.g., 203) is required to be purchased, the authorization unit 207 may check payment information submitted by the user (e.g., 211). The authorization unit 207 may also check payment information stored in the common skill store 206 associated with the user account (e.g., 211). The authorization unit 207 may check the number of user devices (e.g., 213 and 214) associated with the same user account (e.g., 211), and what type(s) of virtual assistant(s) and provider platform(s) the user devices (e.g., 213 and 214) are with. There may be only one user device with one type of virtual assistant. There may be more than one user device but with only one type of virtual assistant. There may be more than one user device and with more than one type of virtual assistant. The authorization process may prepare the modification unit 208 in regard to how many different sets of adapted program code and what types of adapted program code to generate. The authorization unit 207 may also check if there is a cloud storage associated with the user account (e.g., 211), so that the common skill store 206 may back up the adapted program code in the cloud storage according to some aspects of the disclosure.

After the authorization unit 207 authorizes the user account (e.g., 211) to download the program code (e.g., 203), the modification unit 208 may modify some portions of the requested program code (e.g., 203) to generate adapted program code (e.g., 209, 210, . . . ). The adapted program code (e.g., 209, 210, . . . ) is configured to run in a runtime environment associated with a virtual assistant (e.g., 213, 214, . . . ) on a provider platform. Depending on the number of virtual assistants (e.g., 213, 214, . . . ) and provider platforms associated with the user devices (e.g., 213, 214, . . . ) owned by the user (e.g., 211), the modification unit 208 may modify the requested program code (e.g., 203) into just one set of adapted program code (e.g., 209 or 210), or more than one set of adapted program code (e.g., 209 and 210). The modification unit 208 may modify some portions of the requested program code (e.g., 203) by converting statements of the one or more portions of the requested program code (e.g., 203) in a first computer programming language (e.g., Java, C, C #, C++, Python, JavaScript, Ruby, PHP, TypeScript, LinuxShell, etc.) to statements in a second computer programming language (e.g., Java, C, C #, C++, Python, JavaScript, Ruby, PHP, TypeScript, LinuxShell, etc.). This way, a developer (e.g., 201, 202, . . . ) is not bound by the computer programming language required by a specific virtual assistant and provider platform. The modification unit 208 may modify the format and/or style of the requested program code (e.g., 203) to adapt it to the requesting virtual assistant (e.g., 213, 214, . . . ). The modification unit 208 may also modify some portions of the requested program code (e.g., 203) by modifying a configuration portion of the requested program code (e.g., 203) so that the adapted program code (e.g., 209, 210, . . . ) is configurable by the runtime environment associated with the virtual assistant (e.g., 213, 214, . . . ). The configuration portion of the requested program code (e.g., 203) may be a part of the requested program code (e.g., 203), or a different file than the requested program code (e.g., 203).

When the user (e.g., 211) has more than one user device (e.g., 213, 214, . . . ) with more than one virtual assistant (e.g., 213, 214, . . . ) on more than one provider platform, the user (e.g., 211) may not need to request to download the same skill program code multiple times from different stores for different provider platforms. The user (e.g., 211) may request the skill, one time, from the common skill store 206. The common skill store 206 authorization unit 207 may check the total number of user devices and the types of the virtual assistants (e.g., 213, 214, . . . ). The common skill store 206 modification unit 208 may generate multiple sets of adapted program code (e.g., 209, 210, . . . ) for all the types of the virtual assistants (e.g., 213, 214, . . . ) associated with the user account (e.g., 211). The common skill store 206 may send the multiple sets of adapted program code (e.g., 209, 210, . . . ) to all the user devices (e.g., 213, 214, . . . ) for installation. This way, all the user devices (e.g., 213, 214, . . . ) may be installed with a common skill across provider platforms by one request from the user (e.g., 211).

According to various aspects of the disclosure, the functions that the skills may enable the virtual assistants to implement may include finance, communication, education, food, games, health and fitness, home security, local, entertainment, news, shopping, social, sports, travel, weather, etc.

Figure 3:
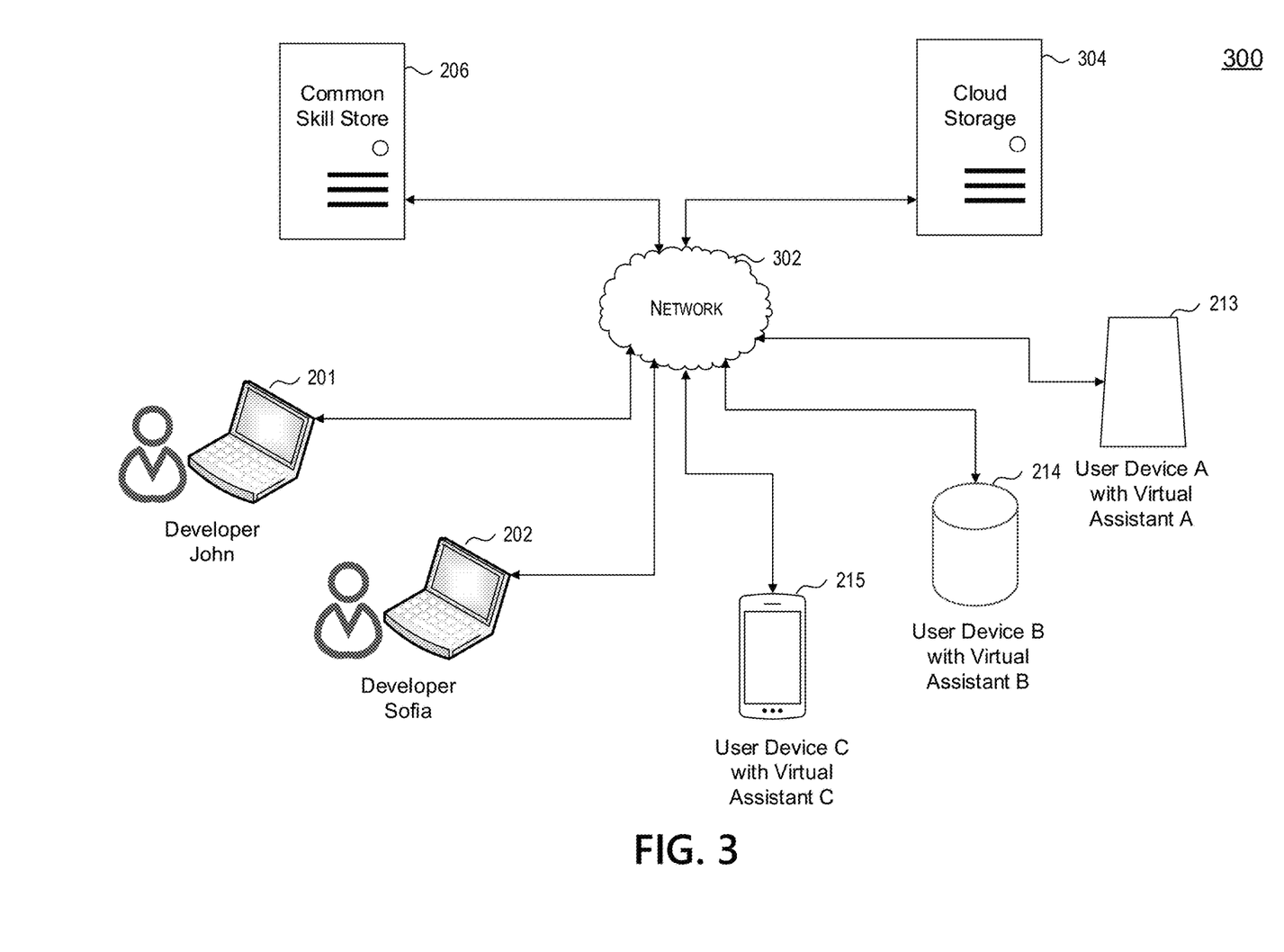
FIG. 3 depicts an example of a skill distribution system that may be used in implementing common skill storage and distribution in accordance with one or more illustrative aspects discussed herein.

FIG. 3 depicts an example of a skill distribution system 300 that may be used in implementing common skill storage and distribution in accordance with one or more illustrative aspects discussed herein. The system 300 shows the connectivity of the common skill store 206, the developer devices (e.g., 201, 202, . . . ), the cloud storage 304, and the user devices (e.g., 213, 214, 215, . . . ) via the network 302. The common skill store 206 may be connected to the network 302. The common skill store 206 may receive program code from the developer devices (e.g., 201, 202). The program code may be computer-readable and computer-executable to implement functions for virtual assistants configured to run on different provider platforms. The common skill store 206 may store the received program code in storage media. The storage media may be a physical or virtualized data storage, or a public or private cloud data storage. The stored program code may be requested by users to be downloaded. Prior to download, the authorization unit 207 may check if the user account is authorized to download the program code. The modification unit 208 may modify the requested program code to adapt them to be configurable by the virtual assistants on the requesting user devices (e.g., 213, 214, 215, . . . ).

The developer devices (e.g., 201, 202) may be connected to the network 302. The developer devices (e.g., 201, 202) may submit program code to the common skill store 206 via the network 302. The program code may be in any computer programming language, format, and/or style a developer chooses. The developer may not be bound by a specific virtual assistant and provider platform. The modification unit 208 may modify the submitted program code to different sets of adapted program code for different virtual assistants on different provider platforms.

The user devices (e.g., 213, 214, 215, . . . ) may be connected to the network 302. The user devices (e.g., 213, 214, 215, . . . ) may submit requests to download program code from the common skill store 206. The user devices (e.g., 213, 214, 215, . . . ) may each include headless speakers and/or smart displays with built-in virtual assistants, or mobile devices capable of installing applications of virtual assistants. There may be more than one type of virtual assistant running on all the user devices associated with one user account. A user may only need to submit one request to download a common skill from the common skill store 206. The modification unit 208 may generate different sets of adapted program code for the different virtual assistants on different provider platforms. This way, all the user devices associated with the same user account may be installed with a common skill across provider platforms by one request from the user.

The cloud storage 304 may be connected to the network 302. The cloud storage 304 may be associated with the user account that is associated with one or more user devices (e.g., 213, 214, 215, . . . ). The user account may be associated with one user device running one virtual assistant. The user account may be associated with more than one user device, and the user devices may be running the same virtual assistant. The user account may be associated with more than one user device, and the user devices may be running different virtual assistants. After the common skill store 206 sends the adapted program code to the user devices (e.g., 213, 214, 215, . . . ) associated with the user account, in some aspects of the disclosure, the common skill store 206 may back up the adapted program code in the cloud storage 304. The common skill store 206 may back up the adapted program code in the cloud storage 304 for security purposes. The back-up adapted program code may also be used to check if an update of the skills may be available. If there is difference between a set of newly adapted program code and the back-up adapted program code for the same skill, an update for the skill may be available. The common skill store 206 may send a push notification notifying the user that an update for a downloaded skill may be available.

Figure 4:
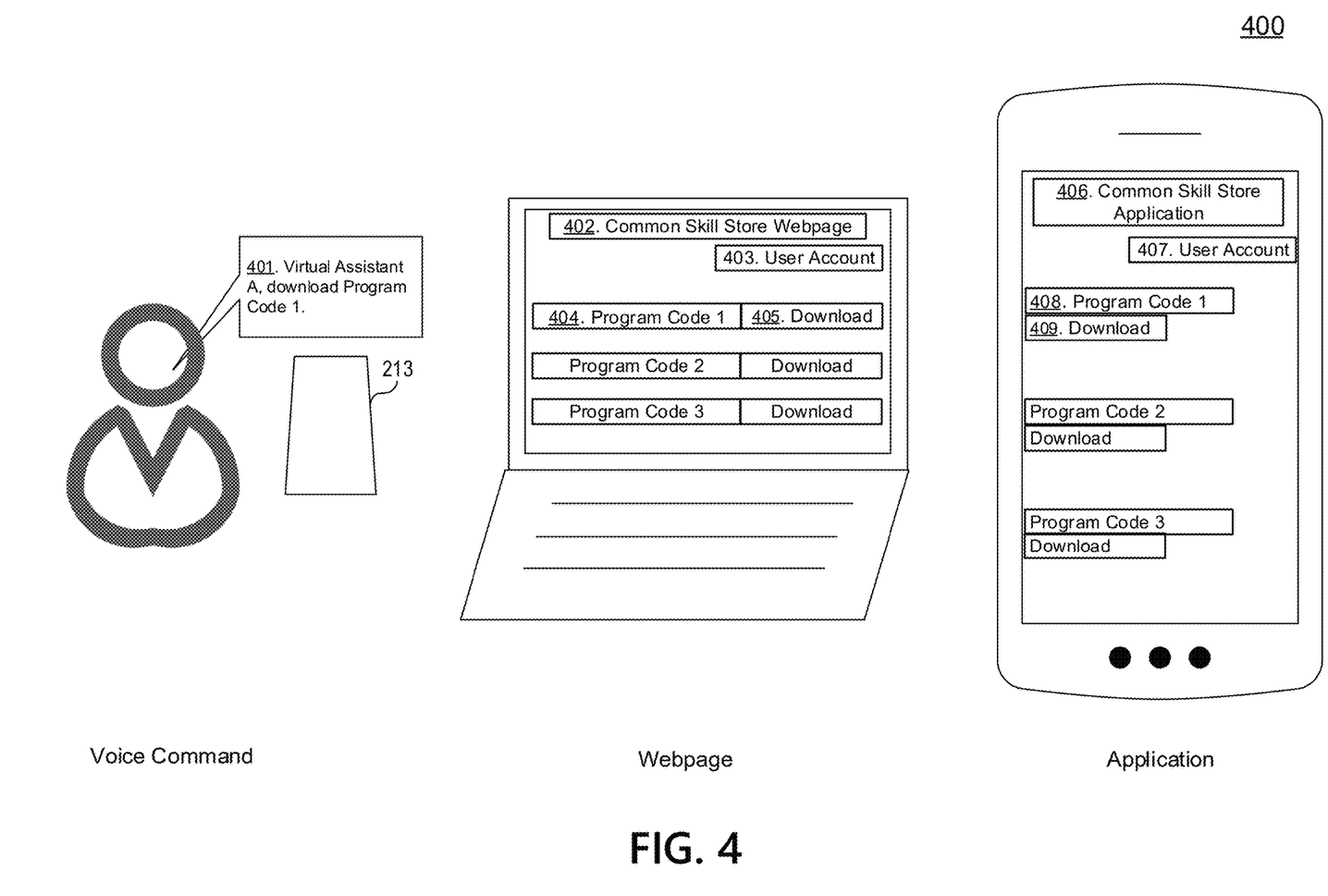
FIG. 4 illustrates some examples of requesting program code to download in accordance with one or more illustrative aspects discussed herein.

FIG. 4 illustrates some examples of requesting program code to download in accordance with one or more illustrative aspects discussed herein. The request to download a set of program code may be by a voice command (e.g., 401). For a user device (e.g., 213, 214, 215, . . . ) with a microphone that may receive and transcribe a voice command, a user may simply say "Virtual Assistant A, download Program Code 1." The voice command may be received by the virtual assistant, and the virtual assistant may communicate to the common skill store 206 with a request to download the program code. The voice command may be in different grammatical variations as long as it conveys the basic idea of requesting to download the program code. For example, the voice command may also be "Virtual Assistant B, enable Skill 2," "Virtual Assistant C, get Program Code 3," "Virtual Assistant D, please purchase Skill 4," etc.

The request to download a set of program code may be made on a common skill store webpage (e.g., 402). The user may need to sign into a user account (e.g., 403) so that the common skill store 206 may send the program code to the user devices associated with the user account (e.g., 403). The authorization unit 207 may find one or more user devices associated with the user account. If there is more than one user device, the authorization unit 207 may find one or more than one virtual assistant running on one or more than one provider platform. The modification unit 208 may modify the requested program code to multiple sets of adapted program code based on the instances. The common skill store webpage 402 may show a list of program code (e.g., 404), and there may be a button to allow download (e.g., 405) of them. The text on the button may be in different grammatical variations as long as it conveys the basic idea of requesting to download the program code. For example, the text on the button may also be "Enable," "Get," "Purchase," etc.

The request to download a set of program code may be made on a common skill store application (e.g., 406), especially on a mobile device. The user may need to sign into a user account (e.g., 407) so that the common skill store 206 may send the program code to the user devices associated with the user account (e.g., 407). The authorization unit 207 may find one or more than one user devices associated with the user account. If there is more than one user device, the authorization unit 207 may find several virtual assistants running on one or more provider platforms. The modification unit 208 may modify the requested program code to multiple sets of adapted program code based on the instances. The common skill store application 406 may show a list of program code (e.g., 408), and there may be a button to allow download (e.g., 409) of them. The text on the button may be in different grammatical variations as long as it conveys the basic idea of requesting to download the program code. For example, the text on the button may also be "Enable," "Get," "Purchase," etc.

Figure 5:
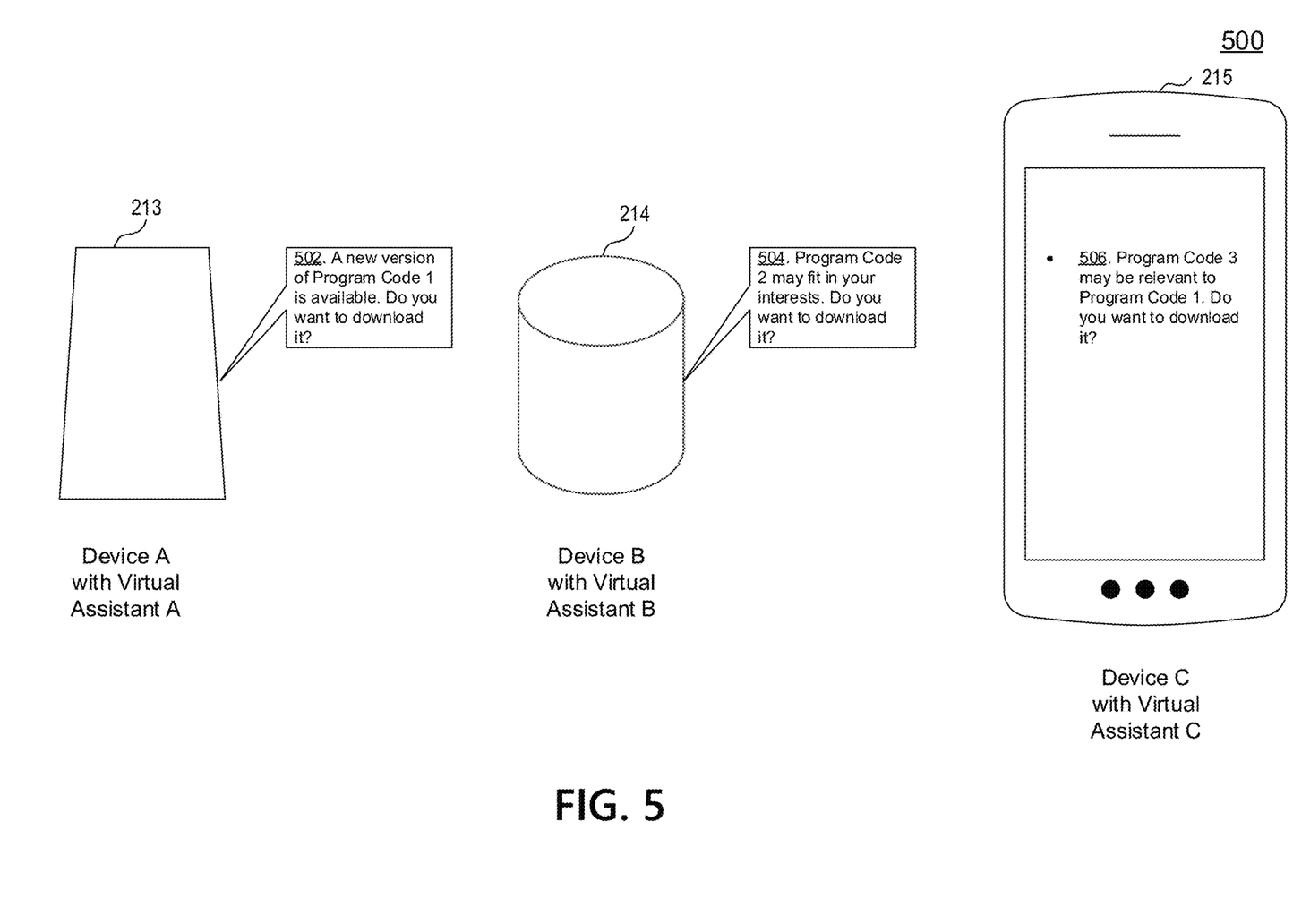
FIG. 5 illustrates some examples of recommending updated or related program code to a user device in accordance with one or more illustrative aspects discussed herein.

FIG. 5 illustrates some examples of recommending updated or related program code to a user device in accordance with one or more illustrative aspects discussed herein. When a new version of the same skill that is already installed on a user device (e.g., 213) associated with a user account is available, the common skill store 206 may send a push notification (e.g., 502) to the user device (e.g., 213) to notify the user of the availability of the new version. If the user device (e.g., 213) is a headless speaker or smart display with a built-in virtual assistant, the common skill store 206 may send the push notification to the virtual assistant so that the virtual assistant may speak "A new version of Program Code 1 is available. Do you want to download it?" The sentence may be in different grammatical variations as long as it conveys the basic idea of notifying the user. For example, the sentence may also be "A new version of Skill 4 is available. Do you want to enable/get/purchase it?", etc. The user may answer "yes" or "no" to the push notification (e.g., 502), indicating an interest of downloading the new version or not. The user may also ignore the push notification (e.g., 502) to show no interest in downloading the new version. If the user device is a mobile device with a virtual assistant application installed, the common skill store 206 may send the push notification as a banner or a message showing on the screen of the mobile device. The user may set up or change push notification options in the mobile device or virtual assistant application settings. After the mobile device displays the push notification, the user may choose to install or not to install the new version.

The common skill store 206 may send a recommendation notification (e.g., 504) to a user device (e.g., 214) of a set of program code not already installed on the user device (e.g., 214). The recommendation may be based on program code download history on the user device (e.g., 214). The program code download history associated with the user account may reveal categories of general interest for the user. The common skill store 206 may also recommend program code based on a current program code collection on the user device (e.g., 214). If the user device (e.g., 214) is a headless speaker or smart display with a built-in virtual assistant, the common skill store 206 may send the recommendation notification to the virtual assistant so that the virtual assistant may speak "Program Code 2 may fit in your interests. Do you want to download it?" The sentence may be in different grammatical variations as long as it conveys the basic idea of recommending program code to the user. For example, the sentence may also be "Skill 5 may be of interest to you. Do you want to enable/get/purchase it?", etc. The user may answer "yes" or "no" to the recommendation notification (e.g., 504), indicating an interest of downloading the recommended program code or not. The user may also ignore the recommendation notification (e.g., 504) to show no interest in downloading the recommended program code. If the user device is a mobile device with a virtual assistant application installed, the common skill store 206 may send the recommendation notification as a banner or a message showing on the screen of the mobile device. The user may set up or change recommendation notification options in the mobile device or virtual assistant application settings. After the mobile device displays the recommendation notification, the user may choose to install or not to install the recommended program code.

The common skill store 206 may send a recommendation notification (e.g., 506) to a user device (e.g., 215) of a set of program code not already installed on the user device (e.g., 215) but relevant to the requested program code. Program code relevant to the requested program code may attract interest from the user. For example, if a user requests "MyFitnessPal" skill, then "FitBit" skill may be of interest to the user. If the user device is a headless speaker or smart display with a built-in virtual assistant, the common skill store 206 may send the recommendation notification to the virtual assistant so that the virtual assistant may speak "Program Code 3 may be relevant to Program Code 1. Do you want to download it?" The sentence may be in different grammatical variations as long as it conveys the basic idea of recommending relevant program code to the user. For example, the sentence may also be "Skill 6 may be related to Program Code 1 you requested to download. Do you want to enable/get/purchase it?", etc. The user may answer "yes" or "no" to the recommendation notification, indicating an interest of downloading the recommended program code or not. The user may also ignore the recommendation notification to show no interest in downloading the recommended program code. If the user device (e.g., 215) is a mobile device with a virtual assistant application installed, the common skill store 206 may send the recommendation notification (e.g., 506) as a banner or a message showing on the screen of the mobile device. The user may set up or change recommendation notification options in the mobile device or virtual assistant application settings. After the mobile device displays the recommendation notification (e.g., 506), the user may choose to install or not to install the recommended program code.

Figure 6:
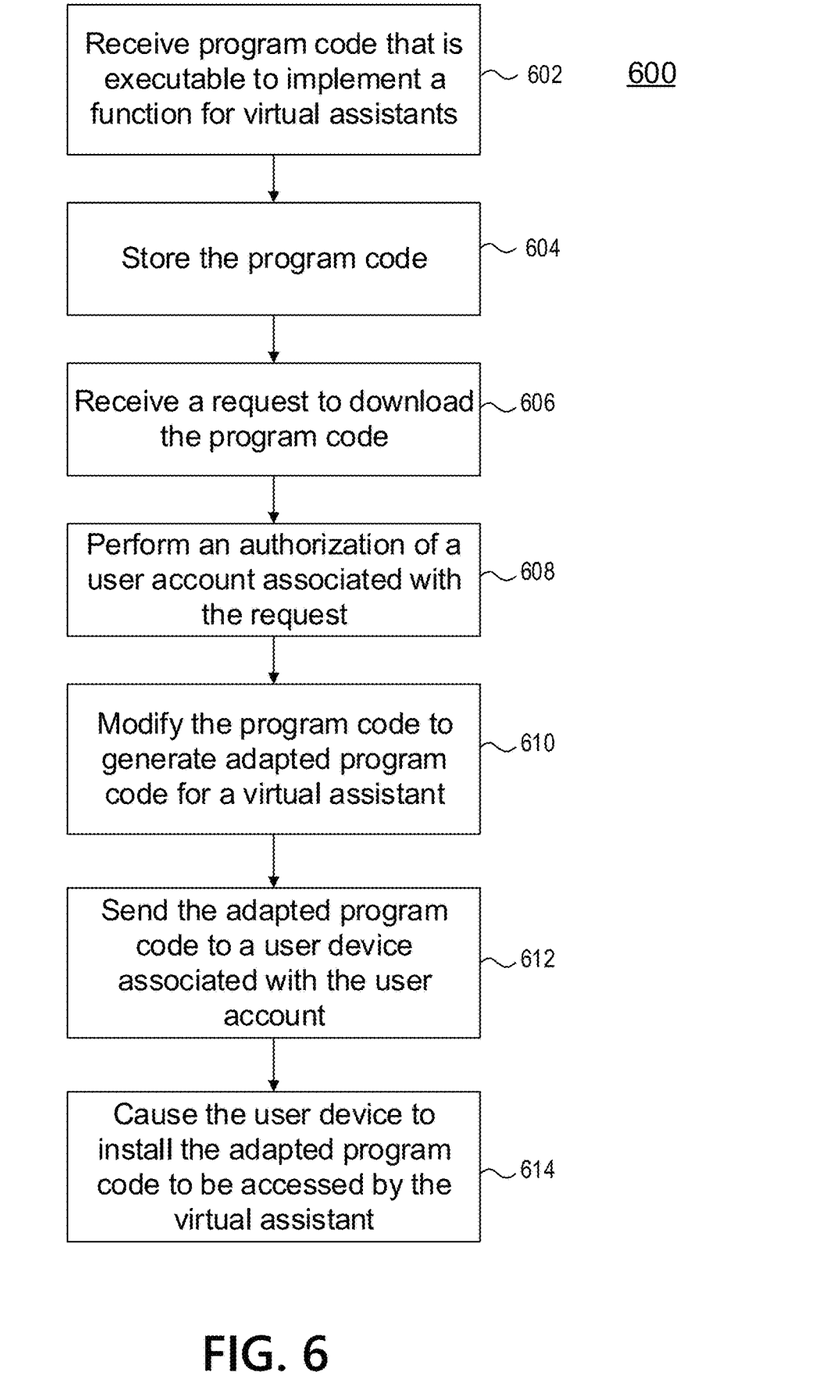
FIG. 6 is a flow chart for a method of storing and distributing a common skill to a user device in accordance with one or more illustrative aspects discussed herein.

FIG. 6 is a flow chart for a method 600 of storing and distributing a common skill to a user device in accordance with one or more illustrative aspects discussed herein. For the purposes of clarity, FIG. 6 is described with reference to FIGS. 2 and 3, but it should be understood that method 600 is not limited to being performed by the systems illustrated therein.

At 602, the common skill store 206 may receive a set of program code from a developer device (e.g., 201, 202 . . . ). The developer device (e.g., 201, 202, . . . ) may be associated with a developer account, and all the program code submitted by the same developer account may be tagged with the developer account. A user may search for a set of program code based on the developer account associated with the program code. The program code submitted may be computer-readable and computer-executable to implement a function for a plurality of virtual assistants, each of the plurality of virtual assistants configured to run on one of a plurality of provider platforms. When submitting the program code, the developer is not bound by computer programming languages, formats, and/or styles required by any specific virtual assistants and provider platforms. The program code may be in any computer programming language (e.g., Java, C, C #, C++, Python, JavaScript, Ruby, PHP, TypeScript, LinuxShell, etc.) of the choosing of the developer. The program code may also be in any formats, styles, and/or with any configuration files. The common skill store 206 or the authorization unit 207 may ascertain the type of the virtual assistant(s) and provider platform(s) of the requesting user device(s). The common skill store 206 or the modification unit 208 may modify the program code after receiving the request to download the program code based on the input from the authorization unit 207 on the type of the virtual assistant(s) and provider platform(s).

At 604, the common skill store 206 may store the program code submitted by the developer device (e.g., 201, 202, . . . ). The common skill store 206 may comprise storage media, and the storage media may be a physical or virtualized data storage, or a public or private cloud data storage. The common skill store 206 may encrypt the program code when storing it. The common skill store 206 may also add restrictions on the program code such as age, required payment information, etc.

At 606, the common skill store 206 may receive a request to download the program code. The common skill store 206 may receive the request from the user device (e.g., 213, 214, 215, . . . ) in the form of a voice command (e.g., 401). The common skill store 206 may also receive the request on the common skill store webpage (e.g., 402) or application (e.g., 406). The user may need to sign into the user account (e.g., 403, 407, . . . ) on the common skill store webpage (e.g., 402) and application (e.g., 406), so that the common skill store 206 may send the requested program code to the associated user devices (e.g., 213, 214, 215, . . . ).

At 608, the common skill store 206 may perform an authorization of the user account associated with the request. The common skill store 206 may have an authorization unit 207 to perform the authorization. The authorization unit 207 may check the number of user devices associated with the user account. Of all the user devices associated with the user account, the authorization unit 207 may check the types of different virtual assistants and different provider platforms. There may be only one user device associated with the user account, and there may be only one virtual assistant and one provider platform for the one user device. There may be more than one user device associated with the user account, and there may be only one virtual assistant and one provider platform for the user devices. There may be more than one user device associated with the user account, and there may be more than one virtual assistant and more than one provider platform for the user devices. Checking the types of the different virtual assistants and different provider platforms may facilitate the modification of the requested program code. The authorization unit 207 may further check if the user account is authorized to download the program code. The program code may be free to all users. The program code may be free to all users but may have restrictions such as age that require a check on the user account. The program code may also require payment information. In this case, the authorization unit 207 may check the payment information submitted by the user. The payment information may also be stored in the common skill store 206 and the authorization unit 207 may check the stored payment information associated with the user account.

At 610, the common skill store 206 may modify the program code to adapt to the virtual assistant running on the requesting user device (e.g., 213, 214, 215, . . . ). The common skill store 206 may have a modification unit 208 to implement the modification. The modification unit 208 may modify one or more portions of the requested program code to generate adapted program code. The adapted program code may be configured to run in a runtime environment associated with the virtual assistant running on the requesting user device (e.g., 213, 214, 215, . . . ). The virtual assistant may be one of the many virtual assistants on one of the many provider platforms. The modification unit 208 may modify the program code to generate multiple sets of adapted program code for different virtual assistants. The modification in the common skill store 206 may eliminate the need for the developers to develop the same skill multiple times in different computer programming languages, formats, and/or styles, etc. In the case where there are multiple virtual assistants associated with one user account, the modification unit 208 may modify the program code to multiple sets of adapted program code, and send the multiple sets of adapted program code to the user devices. The modification in the common skill store 206 may eliminate the need for the user to request the same skill program code for each virtual assistant across different provider platforms. As long as all the user devices are associated with the same user account, the common skill store 206 may send the adapted program code to all the user devices with one request from the user.

At 612, the common skill store 206 may send the adapted program code to the user device (e.g., 213, 214, 215, . . . ) associated with the user account. The user device (e.g., 213, 214, 215, . . . ) is configured to run a virtual assistant. The virtual assistant may execute the adapted program code to implement a function. The function may be in different areas such as finance, communication, education, food, games, health and fitness, home security, local, entertainment, news, shopping, social, sports, travel, weather, etc. In the case where there may be multiple virtual assistants running on multiple provider platforms, the common skill store 206 may send multiple sets of adapted program code to the different multiple virtual assistants.

At 614, the common skill store 206 may cause the user device (e.g., 213, 214, 215, . . . ) to install the adapted program code. After installation, the adapted program code may be accessed by the virtual assistant running on the user device (e.g., 213, 214, 215, . . . ). In the case where there may be multiple different virtual assistants on multiple user devices, the common skill store 206 may cause the multiple user devices to install multiple different sets of adapted program code to be accessed by the multiple different virtual assistants. In some aspects of the disclosure, the common skill store 206 may back up the adapted program code to a cloud storage (e.g., 304) associated with the user account. This way, the back-up adapted program code may be easily accessed again if the installed adapted program code gets corrupted or lost on the user device (e.g., 213, 214, 215, . . . ). The back-up adapted program code may also be compared to a new version of a set of adapted program code to see if an update of the installed skill is available.

Figure 7:
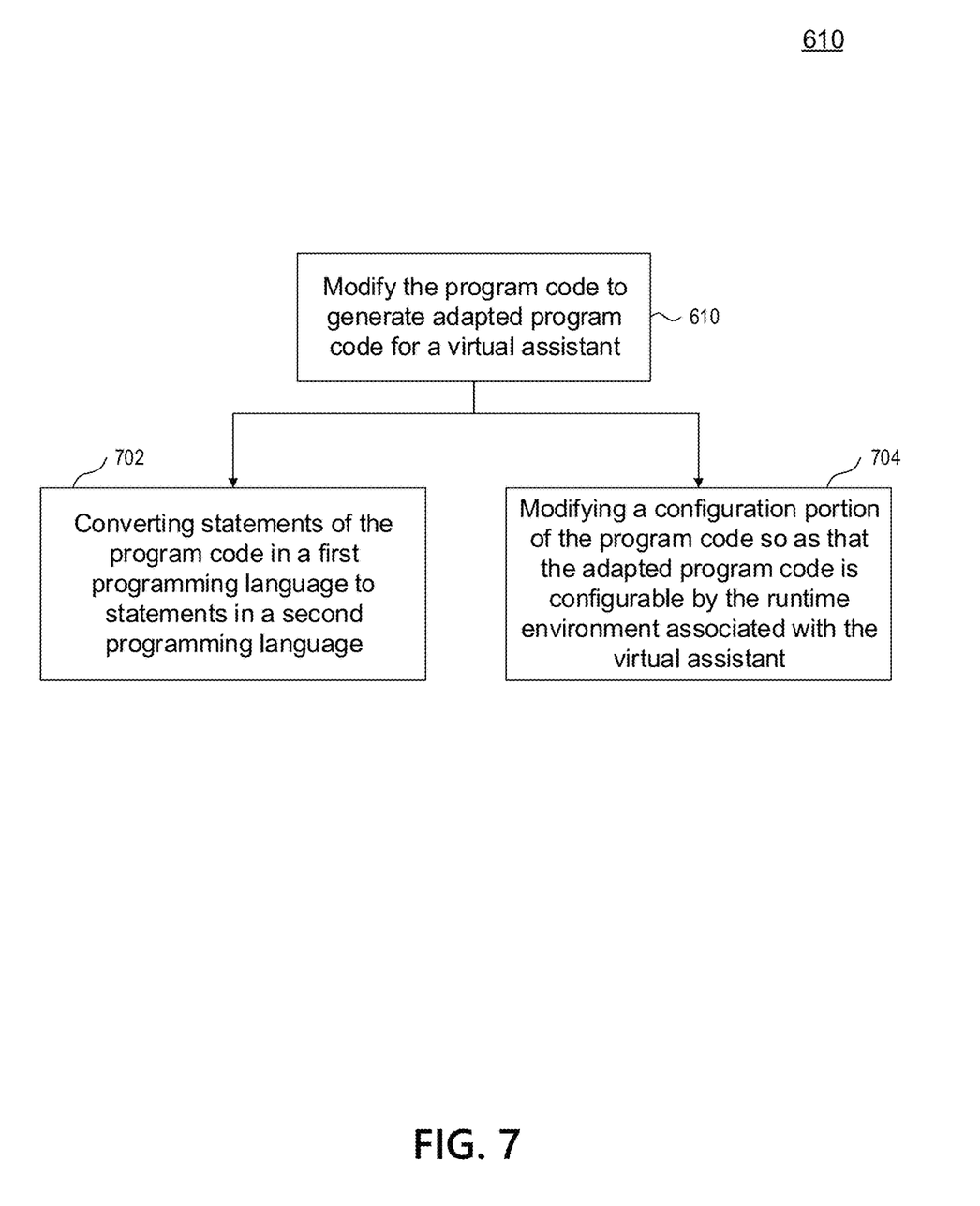
FIG. 7 is a flow chart for a method of modifying a common skill in accordance with one or more illustrative aspects discussed herein.

FIG. 7 is a flow chart for a method 610 of modifying a common skill in accordance with one or more illustrative aspects discussed herein. For the purposes of clarity, FIG. 7 is described with reference to FIGS. 2 and 3, but it should be understood that method 610 is not limited to being performed by the systems illustrated therein. At 610, the common skill store 206 or the modification unit 208 may modify the requested program code to generate adapted program code for a virtual assistant that requires a different computer programming language, format, style, configuration file, etc. from the submitted program code by the developer. The common skill store 206 or the modification unit 208 may modify the requested program code based on machine learning and/or artificial intelligence.

At 702, the modification unit 208 may convert statements of some portions of the requested program code in one computer programming language (e.g., Java, C, C #, C++, Python, JavaScript, Ruby, PHP, TypeScript, LinuxShell, etc.) to statements in another, different computer programming language (e.g., Java, C, C #, C++, Python, JavaScript, Ruby, PHP, TypeScript, LinuxShell, etc.). The statements in the different computer programming language may be readable by the runtime environment associated with the virtual assistant running on the requesting user device.

Alternatively, or additionally, at 704, the modification unit 208 may modify a configuration portion of the requested program code so as that the adapted program code may be configurable by the runtime environment associated with the virtual assistant running on the requesting user device. The configuration portion of the requested program code may be a part of the program code, or a separate file associated with the program code.

Figure 8:
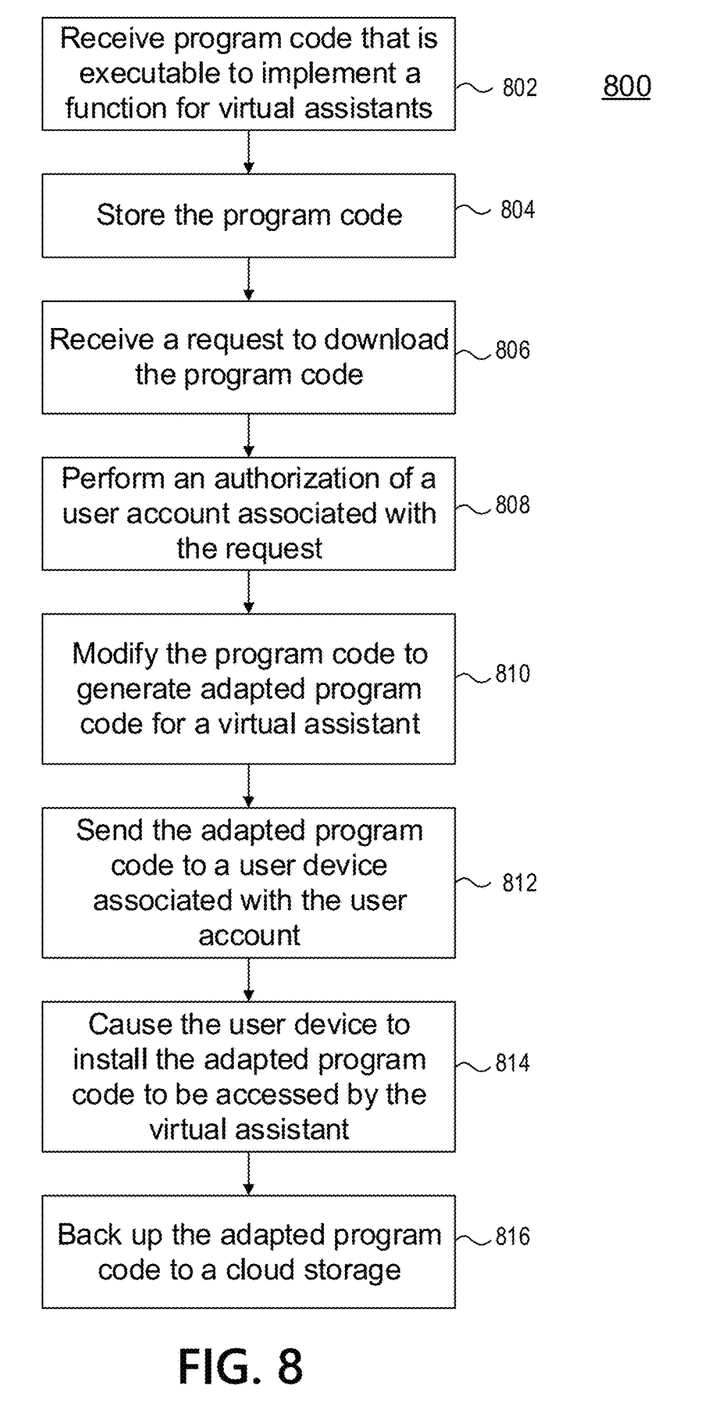
FIG. 8 is a flow chart for a method of storing and distributing a common skill and backing up adapted program code to a cloud storage in accordance with one or more illustrative aspects discussed herein.

FIG. 8 is a flow chart for a method 800 of storing and distributing a common skill and backing up adapted program code to a cloud storage in accordance with one or more illustrative aspects discussed herein. For the purposes of clarity, FIG. 8 is described with reference to FIGS. 2 and 3, but it should be understood that method 800 is not limited to being performed by the systems illustrated therein.

At 802, the common skill store 206 may receive a set of program code from a developer device (e.g., 201, 202 . . . ). The program code submitted may be computer-readable and computer-executable to implement a function for a plurality of virtual assistants, each of the plurality of virtual assistants configured to run on one of a plurality of provider platforms.

At 804, the common skill store 206 may store the program code submitted by the developer device (e.g., 201, 202, . . . ). The common skill store 206 may encrypt the program code when storing it. The common skill store 206 may also add restrictions on the program code such as age, required payment information, etc.

At 806, the common skill store 206 may receive a request to download the program code. The common skill store 206 may receive the request from the user device (e.g., 213, 214, 215, . . . ) in the form of a voice command (e.g., 401). The common skill store 206 may also receive the request on the common skill store webpage (e.g., 402) or application (e.g., 406).

At 808, the common skill store 206 or the authorization unit 207 may perform an authorization of the user account associated with the request. The authorization unit 207 may check the number of user devices associated with the user account. Of all the user devices associated with the user account, the authorization unit 207 may check the types of different virtual assistants and different provider platforms. Checking the types of the different virtual assistants and different provider platforms may facilitate the modification of the requested program code.

At 810, the common skill store 206 or the modification unit 208 may modify the program code to adapt to the virtual assistant running on the requesting user device (e.g., 213, 214, 215, . . . ). The modification unit 208 may modify one or more portions of the requested program code to generate adapted program code. The adapted program code may be configured to run in a runtime environment associated with the virtual assistant running on the requesting user device (e.g., 213, 214, 215, . . . ). The virtual assistant may be one of the many virtual assistants on one of the many provider platforms. The modification unit 208 may modify the program code to generate multiple sets of adapted program code for different virtual assistants. In the case where there are multiple virtual assistants associated with one user account, the modification unit 208 may modify the program code to multiple sets of adapted program code, and send the multiple sets of adapted program code to the user devices.

At 812, the common skill store 206 may send the adapted program code to the user device (e.g., 213, 214, 215, . . . ) associated with the user account. The user device (e.g., 213, 214, 215, . . . ) is configured to run a virtual assistant. The virtual assistant may execute the adapted program code to implement a function. In the case where there may be multiple virtual assistants running on multiple provider platforms, the common skill store 206 may send multiple sets of adapted program code to the different user devices with the different multiple virtual assistants.

At 814, the common skill store 206 may cause the user device (e.g., 213, 214, 215, . . . ) to install the adapted program code. After installation, the adapted program code may be accessed by the virtual assistant running on the user device (e.g., 213, 214, 215, . . . ). In the case where there may be multiple different virtual assistants on multiple user devices, the common skill store 206 may cause the multiple user devices to install multiple different sets of adapted program code to be accessed by the multiple different virtual assistants.

At 816, the common skill store 206 may back up the adapted program code(s) to a cloud storage (e.g., 304) associated with the user account. This way, the back-up adapted program code may be easily accessed again if the installed adapted program code gets corrupted or lost on the user device (e.g., 213, 214, 215, . . . ). The back-up adapted program code may also be compared to a new version of a set of adapted program code to see if an update of the installed skill is available.

Figure 9:
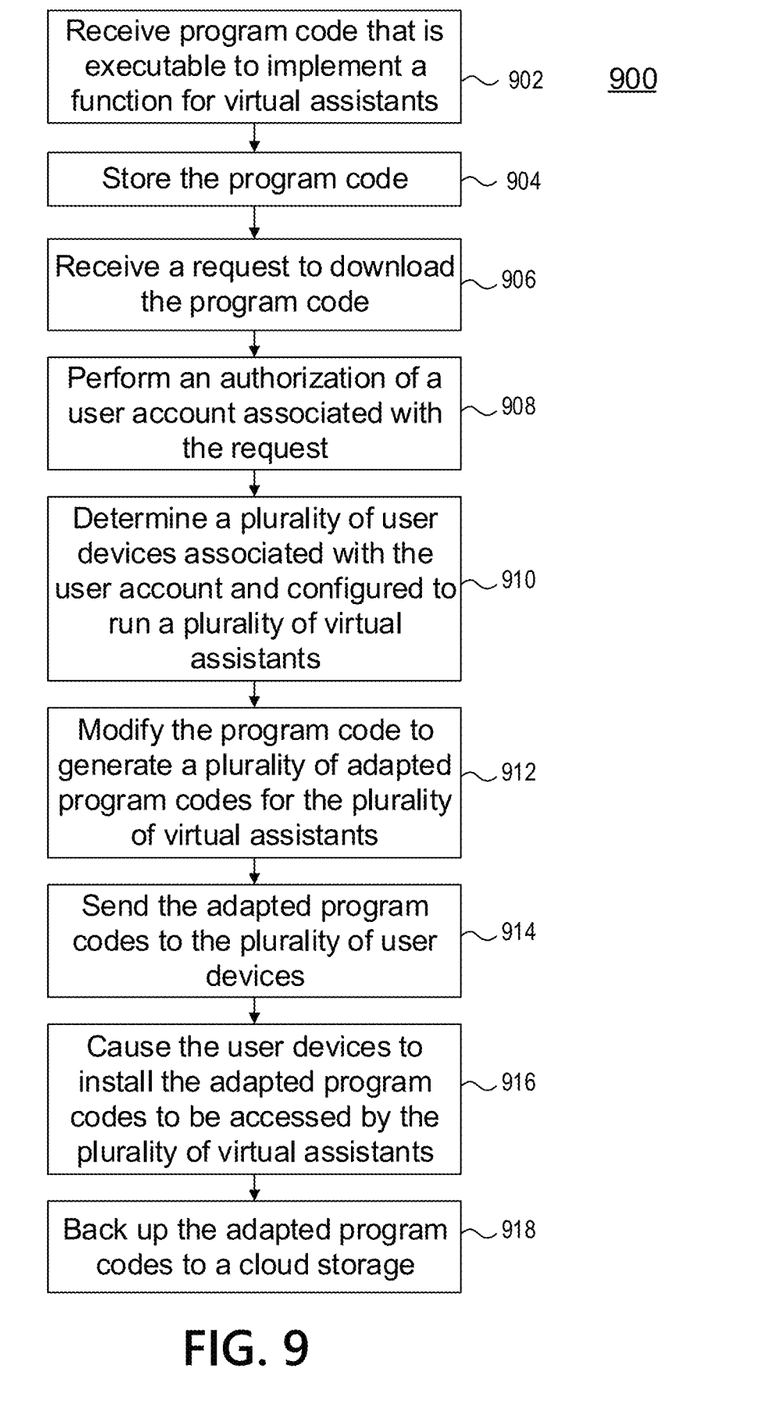
FIG. 9 is a flow chart for a method of storing and distributing a common skill to multiple user devices with different virtual assistants in accordance with one or more illustrative aspects discussed herein.

FIG. 9 is a flow chart for a method 900 of storing and distributing a common skill to multiple user devices with different virtual assistants in accordance with one or more illustrative aspects discussed herein. For the purposes of clarity, FIG. 9 is described with reference to FIGS. 2 and 3, but it should be understood that method 900 is not limited to being performed by the systems illustrated therein.

At 902, the common skill store 206 may receive a set of program code from a developer device (e.g., 201, 202 . . . ). The program code submitted may be computer-readable and computer-executable to implement a function for a plurality of virtual assistants, each of the plurality of virtual assistants configured to run on one of a plurality of provider platforms. At 904, the common skill store 206 may store the program code submitted by the developer device (e.g., 201, 202, . . . ). At 906, the common skill store 206 may receive a request to download the program code. At 908, the common skill store 206 or the authorization unit 207 may perform an authorization of the user account associated with the request. At 910, the common skill store 206 or the authorization unit 207 may determine that there may be multiple devices associated with the user account. Of the multiple devices associated with the user account, there may be multiple different virtual assistants running on different provider platforms. At 912, the common skill store 206 or the modification unit 208 may modify the program code to adapt to the multiple different virtual assistants running on the requesting user devices (e.g., 213, 214, 215, . . . ). The modification unit 208 may modify one or more portions of the requested program code to generate multiple sets of adapted program code for the multiple different virtual assistants. The adapted program code may be configured to run in each of the runtime environment associated with the multiple different virtual assistants. At 914, the common skill store 206 may send the multiple sets of adapted program code to the different user devices running the multiple different virtual assistants. At 916, the common skill store 206 may cause the multiple user devices to install the multiple different sets of adapted program code to be accessed by the multiple different virtual assistants. At 918, the common skill store 206 may back up the adapted program code to a cloud storage (e.g., 304) associated with the user account.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, by a computing device, a request to add common functionality to a plurality of different applications each being configured to run on a different runtime platform, wherein the request is associated with a user account;
   determining, based on the user account, user devices associated with the user account and one or more of the plurality of different applications associated with the user account, wherein the user devices are remote from the computing device, and wherein each of the user devices is configured to run a corresponding one of the plurality of different applications;
   generating one or more adapted program codes by modifying a program code configured to perform the common functionality, wherein each of the one or more adapted program codes is adapted to perform the common functionality in a runtime environment associated with a corresponding one of the plurality of different applications; and
   causing each of the user devices to install a corresponding one of the one or more adapted program codes.

2. The method of claim 1, wherein each of the plurality of different applications comprises a corresponding virtual assistant.

3. The method of claim 1, wherein the modifying the program code comprises:
   converting statements of one or more portions of the program code in a first computer programming language to statements in a second computer programming language, wherein the statements in the second computer programming language are readable by a runtime environment associated with at least one of the plurality of different applications.

4. The method of claim 1, wherein the modifying the program code comprises:
   modifying a configuration portion of the program code such that the one or more adapted program codes are configurable by corresponding runtime environments associated with the plurality of different applications.

5. The method of claim 1, wherein the request to add the common functionality is based on a voice command received by at least one of the user devices.

6. The method of claim 1, wherein the request to add the common functionality is received via a webpage or an application.

7. The method of claim 1, further comprising:
   determining, based on program code download history associated with the user account, a second program code different from the program code; and
   sending, to at least one of the user devices, a recommendation notification for the second program code.

8. The method of claim 1, further comprising:
   determining, based on a relevance score to the program code, a second program code different from the program code; and
   sending, to at least one of the user devices, a recommendation notification for the second program code.

9. The method of claim 1, further comprising:
   determining that the user account is authorized to download the program code.

10. The method of claim 1, further comprising:
    backing up, to a cloud storage associated with the user account, the one or more adapted program codes.

11. The method of claim 1, wherein each of the plurality of different applications are configured to run on a corresponding one of a plurality of provider platforms.

12. An apparatus comprising:
    one or more processors; and
    memory storing instructions that, when executed by the one or more processors, cause the apparatus to:
    store a program code that is executable to implement a function at an applications that is configured to run on a runtime platform;
    receive a request to add common functionality to a plurality of different applications each being configured to run on a different runtime platform, wherein the request is associated with a user account;
    determine, based on the user account, user devices associated with the user account and one or more of the plurality of different applications associated with the user account, wherein the user devices are remote from the apparatus, and wherein each of the user devices is configured to run a corresponding one of the plurality of different applications on a corresponding runtime platform;
    generate one or more adapted program codes by modifying the program code, wherein each of the one or more adapted program codes is configurable by a corresponding one of the plurality of different applications; and
    cause each of the user devices to install a corresponding one of the one or more adapted program codes.

13. The apparatus of claim 12, wherein each of the plurality of different applications comprises a corresponding virtual assistant.

14. The apparatus of claim 12, wherein the instructions cause the apparatus to modify the program code by causing the apparatus to:
    convert statements of one or more portions of the program code in a first computer programming language to statements in a second computer programming language, wherein the statements in the second computer programming language is readable by a runtime environment associated with at least one of the plurality of different applications.

15. The apparatus of claim 12, wherein each of the one or more adapted program codes is configured to run in a runtime environment associated with a corresponding one of the plurality of different applications.

16. The apparatus of claim 12, wherein the request to add the common functionality is based on a voice command received by one of the user devices.

17. The apparatus of claim 12, wherein the instructions, when executed by the one or more processors further cause the apparatus to:
    back up, to a cloud storage associated with the user account, the one or more adapted program codes.

18. A non-transitory computer-readable medium storing instructions that, when executed by one or more processors, cause a computing device to:

store a program code that is executable to implement a function at an application that is configured to run on a runtime platform;

receive a request to add common functionality to a plurality of different applications each being configured to run on a different runtime platform, wherein the request is associated with a user account;

determine, based on the user account, user devices associated with the user account and one or more of the plurality of different applications associated with the user account, wherein the user devices are remote from the computing device, and wherein each of the user devices is configured to run a corresponding one of the plurality of different applications on a corresponding runtime platform;

generate one or more adapted program codes by modifying the program code, wherein each of the one or more adapted program codes is adapted to perform the common functionality in a runtime environment associated with a corresponding one of the plurality of different applications; and cause each of the user devices to install a corresponding one of the one or more adapted program codes.

19. The non-transitory computer-readable medium of claim 18, wherein each of the plurality of different applications comprises a corresponding virtual assistant.

20. The non-transitory computer-readable medium of claim 18, wherein the instructions cause the computing device to modify the program code by causing the computing device to:

convert statements of one or more portions of the program code in a first computer programming language to statements in a second computer programming language, wherein the statements in the second computer programming language are readable by a runtime environment associated with at least one of the plurality of different applications; or modify a configuration portion of the program code such that the one or more adapted program codes are configurable by corresponding runtime environments associated with the plurality of different applications.

* * * * *